(12) United States Patent
Motomura et al.

(10) Patent No.: US 10,175,365 B2
(45) Date of Patent: Jan. 8, 2019

(54) RADIATION DETECTION ELEMENT AND RADIATION DETECTION DEVICE

(71) Applicant: DAI NIPPON PRINTING Co., Ltd., Tokyo (JP)

(72) Inventors: Tomohisa Motomura, Tokyo (JP); Kohei Ota, Tokyo (JP); Toru Tanimori, Kyoto (JP); Atsushi Takada, Kyoto (JP); Taito Takemura, Kyoto (JP)

(73) Assignee: DAI NIPPON PRINTING Co., Ltd., Tokyo (JP)

( * ) Notice: Subject to any disclaimer, the term of this patent is extended or adjusted under 35 U.S.C. 154(b) by 0 days.

(21) Appl. No.: 15/994,123

(22) Filed: May 31, 2018

(65) Prior Publication Data

US 2018/0292546 A1   Oct. 11, 2018

Related U.S. Application Data

(63) Continuation of application No. PCT/JP2016/085539, filed on Nov. 30, 2016.

(30) Foreign Application Priority Data

Dec. 3, 2015   (JP) .................................. 2015-236618

(51) Int. Cl.
*G01T 1/18* (2006.01)
*G01T 5/00* (2006.01)
*H01J 47/06* (2006.01)

(52) U.S. Cl.
CPC .................. *G01T 1/18* (2013.01); *G01T 5/00* (2013.01); *H01J 47/06* (2013.01)

(58) Field of Classification Search
CPC ............... G01T 1/18; G01T 5/00; H01J 47/06
USPC ....................................................... 250/385.1
See application file for complete search history.

(56) References Cited

U.S. PATENT DOCUMENTS

2002/0134945 A1*  9/2002  Tanimori ................ G01T 1/185
                                                          250/385.1

FOREIGN PATENT DOCUMENTS

| JP | 2002-6047 A | 1/2002 |
|----|-------------|--------|
| JP | 3354551 B2 | 12/2002 |
| JP | 2009-264997 A | 11/2009 |

(Continued)

OTHER PUBLICATIONS

Written Opinion of the International Search Authority dated Feb. 28, 2017 for PCT Application PCT/JP2016/085539.

(Continued)

*Primary Examiner* — David Porta
*Assistant Examiner* — Meenakshi Sahu
(74) *Attorney, Agent, or Firm* — Typha IP LLC

(57) ABSTRACT

A radiation detection element includes a plurality of pixel electrodes, each pixel electrodes including a first electrode placed on the first surface of an insulating member and having an opening portion and a second electrode placed at the opening portion of the first electrode. The plurality of pixel electrodes is arrayed in the row direction and the column direction. The pitch of the pixel electrodes in the row direction and the column direction is 380 µm or less. An area ratio between the first electrode and the second electrode falls within the range of 14.5:1 to 154.6:1.

10 Claims, 15 Drawing Sheets

(56) References Cited

FOREIGN PATENT DOCUMENTS

JP    2011-247602 A    12/2011
JP     2014-89199 A     5/2014

OTHER PUBLICATIONS

Written Opinion of the International Search Authority dated Feb. 28, 2017 for the PCT Application No. PCT/JP2016/085539, with (corrected) English translation.
International Search Report dated Feb. 28, 2017 for PCT Application PCT/JP2016/085539.

\* cited by examiner

RADIATION DETECTION ELEMENT AND RADIATION DETECTION DEVICE

CROSS-REFERENCE TO RELATED APPLICATIONS

This application is based upon and claims the benefit of priority from the prior Japanese Patent Application No. 2015-236618, filed on Dec. 3, 2015, and PCT International Patent Application No. PCT/JP2016/085539, filed on Nov. 30, 2016, the entire contents of which are incorporated herein by reference.

FIELD

The present invention relates to a radiation detection element and a radiation detection device and, more particularly, to the structure of pixel electrodes constituting a radiation detection element.

BACKGROUND

A radiation detection device using gas amplification by pixel-type electrodes has been studied. A radiation detection device using gas amplification by pixel-type electrodes is featured to be able to implement large-area and real-time imaging in imaging, in particular, with respect to a detection region that has insufficiently been imaged by radiation detection using a conventional detection device.

Refer to, for example, Japanese Patent No. 3354551 for information about the structure of a radiation detection device using gas amplification by pixel-type electrodes.

SUMMARY

According to one embodiment of the present invention, a radiation detection element includes a plurality of pixel electrodes, each pixel electrodes including a first electrode placed on a first surface of an insulating member and having an opening portion and a second electrode placed at the opening portion of the first electrode. The plurality of pixel electrodes is arrayed in a row direction and a column direction. A pitch of the pixel electrodes in the row direction and the column direction is 380 μm or less. An area ratio between the first electrode and the second electrode falls within the range of 14.5:1 to 154.6:1.

According to one embodiment of the present invention, a radiation detection element includes a plurality of pixel electrodes, each pixel electrodes including a first electrode placed on a first surface of an insulating member and having an opening portion and a second electrode placed at the opening portion of the first electrode. The plurality of pixel electrodes is arrayed in a row direction and a column direction. A pitch of the pixel electrodes in the row direction and the column direction is 380 μm or less. A letting P be the pitch of the pixel electrodes, C be the interval between the first electrodes, R be the radius of the second electrode, and G be the interval between the first electrode and the second electrode, 200 (μm)≤P≤380 (μm)≤C, and 30 (μm)≤R. An area ratio between the first electrode and the second electrode falls within the range of 14.5:1 to $[(P-C)P-(R+G)^2 \times 3.14]/(3.14 \times R^2):1$.

According to one embodiment of the present invention, a radiation detection device includes a radiation detection element, the radiation detection element including a plurality of pixel electrodes, each pixel electrodes including a first electrode placed on a first surface of an insulating member and having an opening portion and a second electrode placed at the opening portion of the first electrode. The plurality of pixel electrodes is arrayed in a row direction and a column direction. A pitch of the pixel electrodes in the row direction and the column direction is 380 μm or less. An area ratio between the first electrode and the second electrode falls within a range of 14.5:1 to 154.6:1.

According to one embodiment of the present invention, a radiation detection device includes a radiation detection element, the radiation detection element including a plurality of pixel electrodes, each pixel electrodes including a first electrode placed on a first surface of an insulating member and having an opening portion and a second electrode placed at the opening portion of the first electrode. The plurality of pixel electrodes is arrayed in a row direction and a column direction. A pitch of the pixel electrodes in the row direction and the column direction is 380 μm or less. A letting P be the pitch of the pixel electrodes, C be the interval between the first electrodes, R be the radius of the second electrode, and G be the interval between the first electrode and the second electrode, 200 (μm)≤P≤380 (μm), 10 (μm)≤C, and 30 (μm) ≤R. An area ratio between the first electrode and the second electrode falls within the range of 14.5:1 to $[(P-C)P-(R+G)^2 \times 3.14]/(3.14 \times R^2):1$.

DESCRIPTION OF EMBODIMENTS

Figure 1:
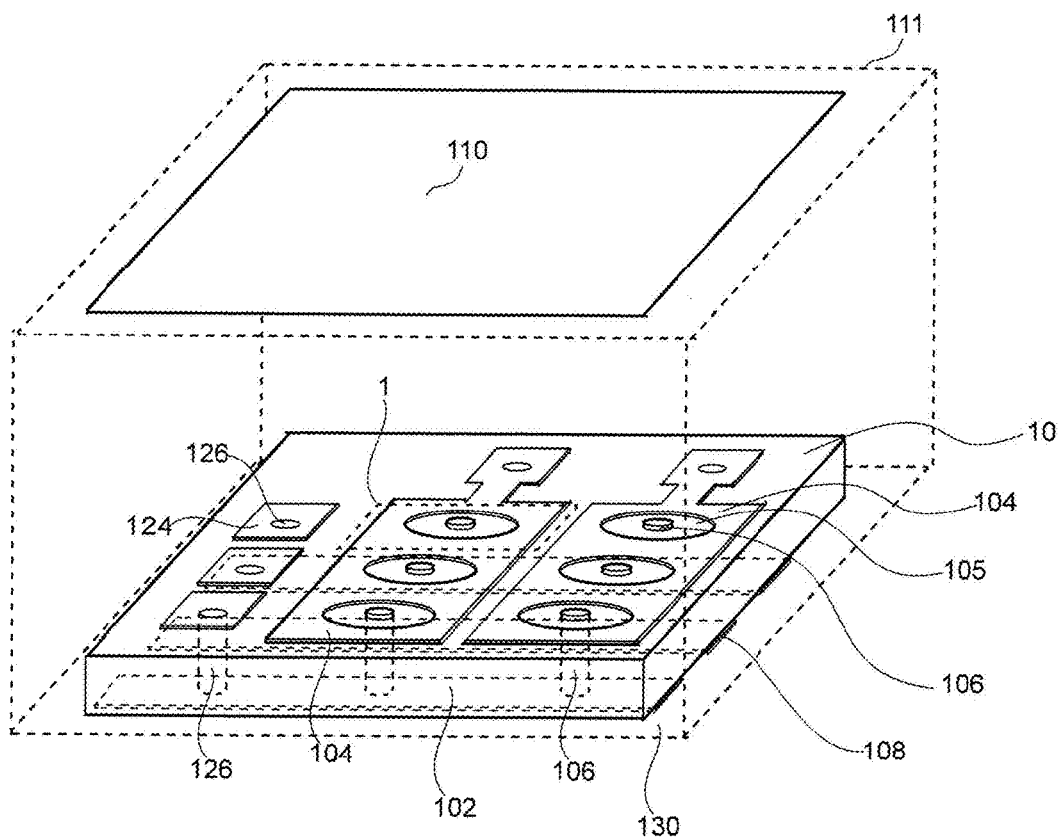
FIG. 1 is a schematic view showing an example of a radiation detection device including a radiation detection element according to one embodiment of the present invention.

A radiation detection element and a radiation detection device according to the present invention will be described in detail below with reference to the accompanying drawings. Note that the radiation detection element and the radiation detection device according to the present invention are not limited to the following embodiments and can be variously modified and embodied. In all the embodiments, the same reference numerals denote the same constituent elements. Furthermore, for the sake of descriptive convenience, dimensional ratios in the accompanying drawings are sometimes different from actual ratios, and an illustration of some components is sometimes omitted from the drawings.

Brief Overview of Radiation Detection Device

The structures of a radiation detection element 10 and a radiation detection device 100 according to one embodiment of the present invention will be described with reference to FIG. 1, FIG. 2A, and FIG. 2B.

The radiation detection element 10 according to one embodiment of the present invention includes an insulating member 102, cathode electrodes 104, anode electrodes 106, anode electrode patterns 108, and a substrate 130.

Figure 2A:
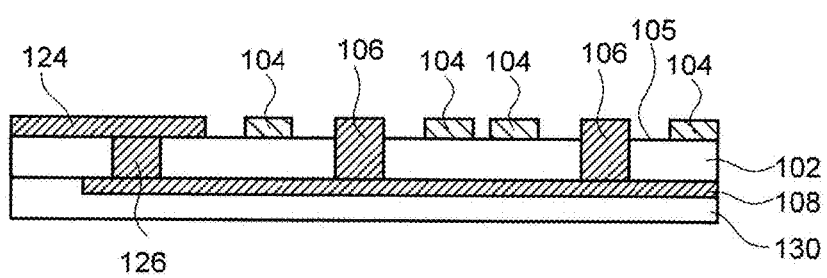
FIG. 2A is a sectional view showing the radiation detection element according to one embodiment of the present invention.

FIG. 2A is a sectional view showing the radiation detection element 10 according to one embodiment of the present invention. FIG. 2B is a planar view showing the radiation detection element 10 according to one embodiment of the present invention. FIG. 2B is a planar view of the radiation detection element 10 and FIG. 2A is a sectional view taken along a line A-A' in FIG. 2B. As shown in FIG. 2A and FIG. 2B, the plurality of cathode electrodes 104 is arranged on the first surface of the insulating member 102. The cathode electrodes 104 have a plurality of opening portions 105. Each cathode electrode 104 is formed into a strip shape and hence is also called a cathode strip electrode.

Figure 2B:
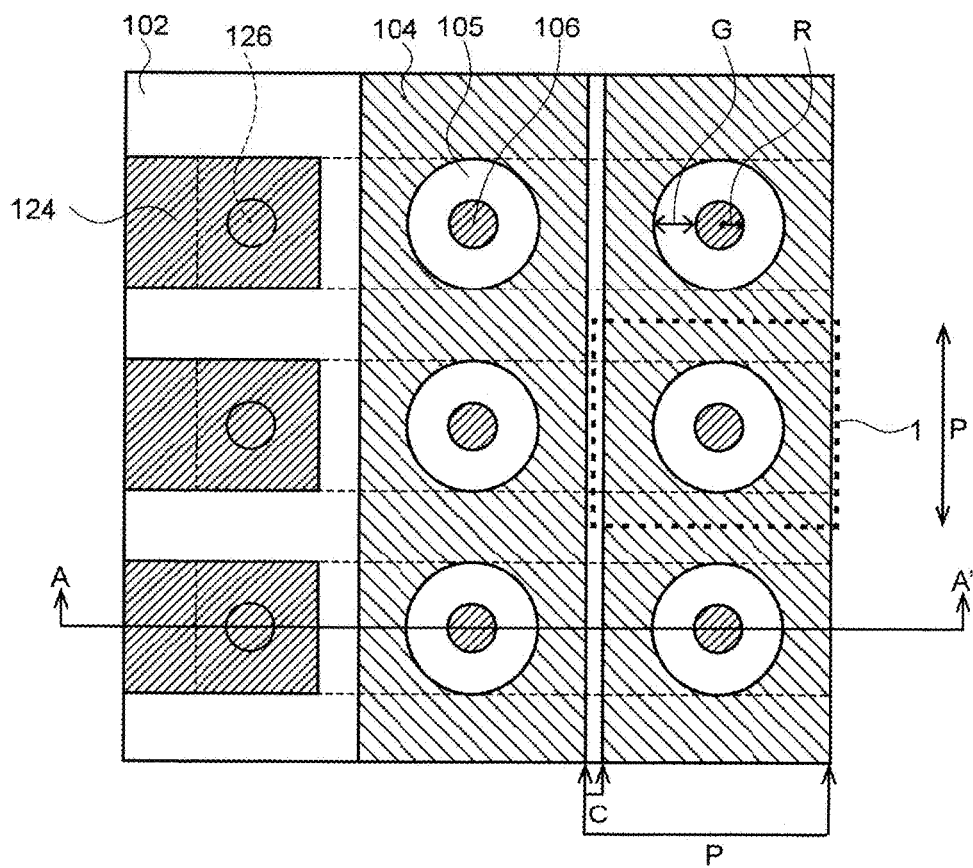
FIG. 2B is a planar view showing the radiation detection element according to one embodiment of the present invention.

As shown in FIG. 2A and FIG. 2B, in this embodiment, the anode electrode patterns 108 are arranged on the second surface of the insulating member 102 on the opposite side to the first surface. The insulating member 102 has through holes in the opening portions 105 of the cathode electrodes 104. The anode electrodes 106 are arranged to be exposed to the first surface via the through holes. The anode electrodes 106 extend through the insulating member 102 from the first surface to the second surface of the insulating member 102 on the opposite side and are connected to the anode electrode patterns 108. In other words, the anode electrodes 106 are connected to the anode electrode patterns 108 arranged on the substrate 130 formed from an insulating member and arranged so as to extend through the insulating member 102. In one embodiment, each anode electrode 106 is shaped such that its distal end is exposed in the opening portion 105. However, each anode electrode 106 may be shaped such that its distal end is not exposed in the opening portion 105 (including a distal end shaped to be almost flushed with the upper surface of the insulating member 102 or a distal end shaped to be located inside the insulating member 102). In the embodiment, the direction in which each cathode electrode 104 extends is almost perpendicular to the direction in which each anode electrode pattern 108 to which the anode electrode 106 is connected extends.

A minimum repetition unit as a pixel electrode including the cathode electrode 104, the opening portion 105, the anode electrode 106, and the insulating member 102 is a pixel electrode 1. The pixel electrode 1 has a nearly square shape. Letting P be the length of one side of a pixel electrode, the pitch of the cathode electrodes 104 and the pitch of the anode electrodes 106 are also represented by P. FIG. 1 shows the six pixel electrodes 1 in one radiation detection element 10. However, this is not exhaustive. The radiation detection element 10 may have a plurality of pixel electrodes 1.

The pixel electrodes 1 of the radiation detection element 10 according to this embodiment are arrayed in the row and column directions. The pitch of pixel electrodes in the row and column directions is 380 μm or less, preferably 300 μm or less, more preferably 200 μm. In other words, the radiation detection element 10 according to the embodiment is configured such that the pitch of the anode electrodes 106 on the first surface in the row and column directions is 380 μm or less, preferably 300 μm, more preferably 200 μm. This improves the resolution of the radiation detection device 100 according to the embodiment.

The pixel electrode 1 of the radiation detection element 10 according to this embodiment is configured such that the area ratio between the cathode electrode 104 and the anode electrode 106 on the first surface falls within the range of 14.5:1 to 154.6:1, preferably 14.5:1 to $[(P-C)P-(R+G)^2 \times 3.14]/(3.14 \times R^2)$:1. Letting P be a pixel electrode pitch, C be the interval between the cathode electrodes 104, R be the radius of the anode electrode 106, and G be the interval between the cathode electrode 104 and the anode electrode 106, 200 (μm)≤P≤380 (μm), 10 (μm)≤C, and 30 (μm)≤R. This makes it possible to maintain the potential difference between the respective electrodes and restrict a reduction in the gas amplification factor of the radiation detection device 100 according to the embodiment.

In general, simply reducing the interval between the anode electrode and the cathode electrodes tends to lead to discharge. In contrast, in this embodiment, because gas amplification can be maintained even by a low voltage, it is possible to avoid the possibility of discharge.

Lead wires 124 are provided on the obverse surface of the substrate of the radiation detection element 10, and the anode electrodes 106 are respectively connected to the lead wires 124 via the anode electrode patterns 108 and interlayer connecting portions 126. That is, the anode electrode 106, the anode electrode pattern 108, the interlayer connecting portion 126, and the lead wire 124 each are one conductor. The lead wire 124 functions as a connecting terminal of the anode electrode 106. In this embodiment exemplifies an aspect in which the anode electrodes 106, the anode electrode patterns 108, the interlayer connecting portions 126, and the lead wires 124 are separately provided and electrically connected to each other. However, this is not exhaustive, and they may be integrally formed. Each anode electrode pattern 108 is formed into a strip shape and hence is also called an anode strip pattern.

If the plurality of cathode electrodes 104 and the plurality of anode electrodes 106 are uniform in height on the first surface of the insulating member 102, even focusing electric force lines onto each anode electrode 106 by applying a high voltage will cause no discharge.

The material for the insulating member 102 and the substrate 130 according to one embodiment of the present invention is polyimide. However, this is not exhaustive, and any material having insulating properties can be used. The material for the cathode electrodes 104, the anode electrodes 106, the anode electrode patterns 108, the interlayer connecting portions 126, and the lead wires 124 is copper. However, this is not exhaustive, and any material having conductivity can be used.

The radiation detection element 10 according to one embodiment of the present invention has the plurality of pixel electrodes 1 arranged, with each pixel electrode 1 including the anode electrode 106 and part of the cathode electrode 104. In the radiation detection element 10, the anode electrodes 106 are arranged in a matrix pattern.

FIG. 1 is a schematic view showing an example of the arrangement of the radiation detection device 100 according to one embodiment of the present invention. As shown in FIG. 1, the radiation detection device 100 according to the embodiment includes a drift electrode 110, the radiation detection element 10, and a chamber 111. The drift electrode 110 and the radiation detection element 10 are vertically stacked so as to face each other through a predetermined space. In some cases, the cathode electrode 104, the anode electrode 106, and the drift electrode 110 are respectively referred to as the first electrode, the second electrode, and the third electrode.

As shown in FIG. 1, the configuration of the radiation detection device 100 is arranged in the chamber 111 in which a gas mixture of a rare gas such as argon or xenon and a molecular gas such as ethane or methane is sealed. The radiation detection device 100 detects radiation incident between each pixel electrode 1 and the drift electrode 110 with the radiation detection element 10.

Radiation Detection Principle

Figure 3:
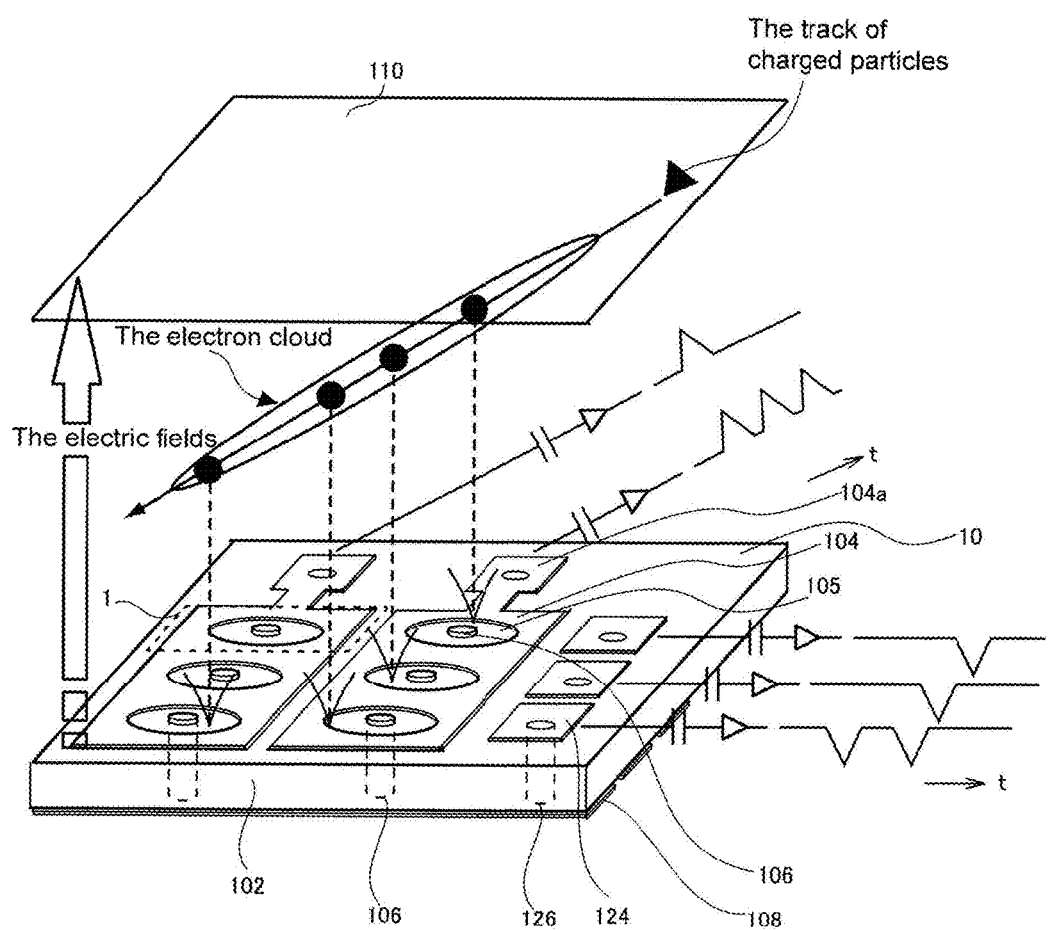
FIG. 3 is a schematic view showing the radiation detection principle of the radiation detection device according to one embodiment of the present invention.

The operation principle of the radiation detection device according to one embodiment of the present invention will be described with reference to FIG. 3. A voltage is applied between each cathode electrode 104 and a corresponding one of the anode electrodes 106 to form an electric field. The cathode electrode 104 is connected to ground (GND), and a voltage is also applied between the drift electrode 110 and the cathode electrode 104 to form an electric field.

When radiation enters, an electron cloud is formed by electrons generated by the interaction between the incident radiation and the existing gas due to the influence of the electric fields generated by the drift electrode 110 and the cathode electrodes 104, and is attracted toward the pixel electrodes 1 each constituted by the anode electrode 106 and the cathode electrode 104. At this time, the attracted electrons collide with gaseous atoms to ionize the gaseous atoms. The electrons ionized by gas amplification proliferate in an avalanche-like manner to such a degree that the electrons collected by each anode electrode 106 can be read out as an electrical signal. This electrical signal can be read out from the lead wire 124 as a connecting terminal via the anode electrode pattern 108. On the other hand, a positive charge induced by an electron group is generated in the cathode electrode 104. An electrical signal obtained from each cathode electrode 104 can be read out from a connecting terminal 104a of the cathode electrode. Chronologically measuring these electrical signals can measure the track of charged particles.

The pitch of the pixel electrodes 1 of the radiation detection element 10 according to this embodiment is 380 µm or less, preferably 300 µm or less, more preferably 200 µm. In other words, in the radiation detection element 10 according to the embodiment, the pitch of the anode electrodes 106 on the first surface is 380 µm or less, preferably 300 µm or less, more preferably 200 µm. This improves the resolution of the radiation detection device 100 according to the embodiment.

Each pixel electrode 1 of the radiation detection element 10 according to this embodiment is configured such that the area ratio between the cathode electrode 104 and the anode electrode 106 on the first surface falls within the range of 14.5:1 to 154.6:1, preferably the range of 14.5:1 to [(P−C) P−(R+G)$^2$×3.14]/(3.14×R$^2$):1. Letting P be a pixel electrode pitch, C be the interval between the cathode electrodes 104, R be the radius of the anode electrode 106, and G be the interval between the cathode electrode 104 and the anode electrode 106, 200 (µm)≤P≤380 (µm), 10 (µm)≤C, and 30 (µm)≤R. This makes it possible to maintain the potential difference between the respective electrodes and restrict a reduction in the gas amplification factor of the radiation detection device 100 according to the embodiment.

The radiation detection device 100 having the radiation detection element 10 satisfying such conditions can improve the resolution and restrict a reduction in gas amplification factor. In addition, because an increase in voltage can be restricted, it is possible to avoid the possibility of discharge.

Note that the present invention is not limited to the above embodiment and can be modified as necessary without departing from the spirit of the invention.

EXAMPLES

The radiation detection device having the radiation detection element according to the present invention will be described in more detail.

Studies have been made on a pixel electrode pitch and the area ratio between the anode electrode and the cathode electrodes which improve the resolution of the radiation detection element according to one embodiment of the present invention and maintain a gas amplification factor.

Simulation 1

A simulation concerning gas amplification has been performed by using the Garfield++ as a simulator.

First of all, the cathode electrode pitch and the anode electrode pitch were reduced without changing the opening diameter of each cathode electrode and the diameter of each anode electrode. The following are the parameters used in this simulation.

Figure 4:
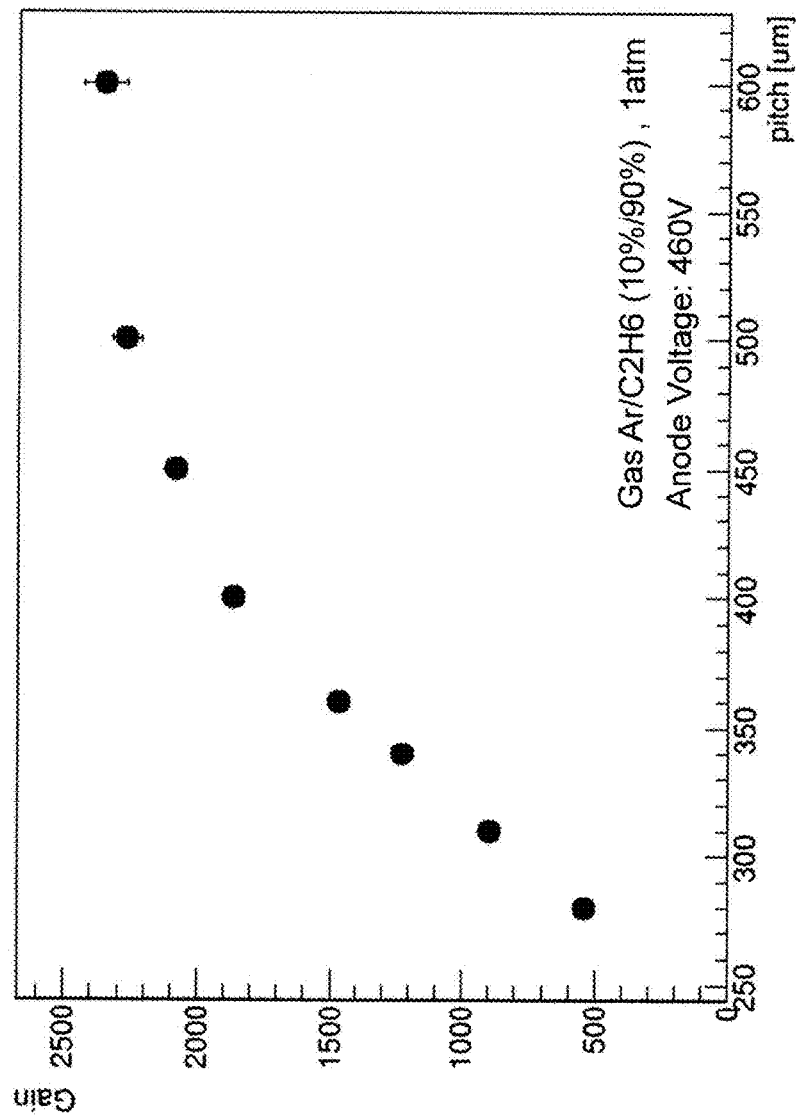
FIG. 4 is a graph showing the relationship between gas amplification factors and pixel electrode pitches in simulation 1.
Figure 5A:
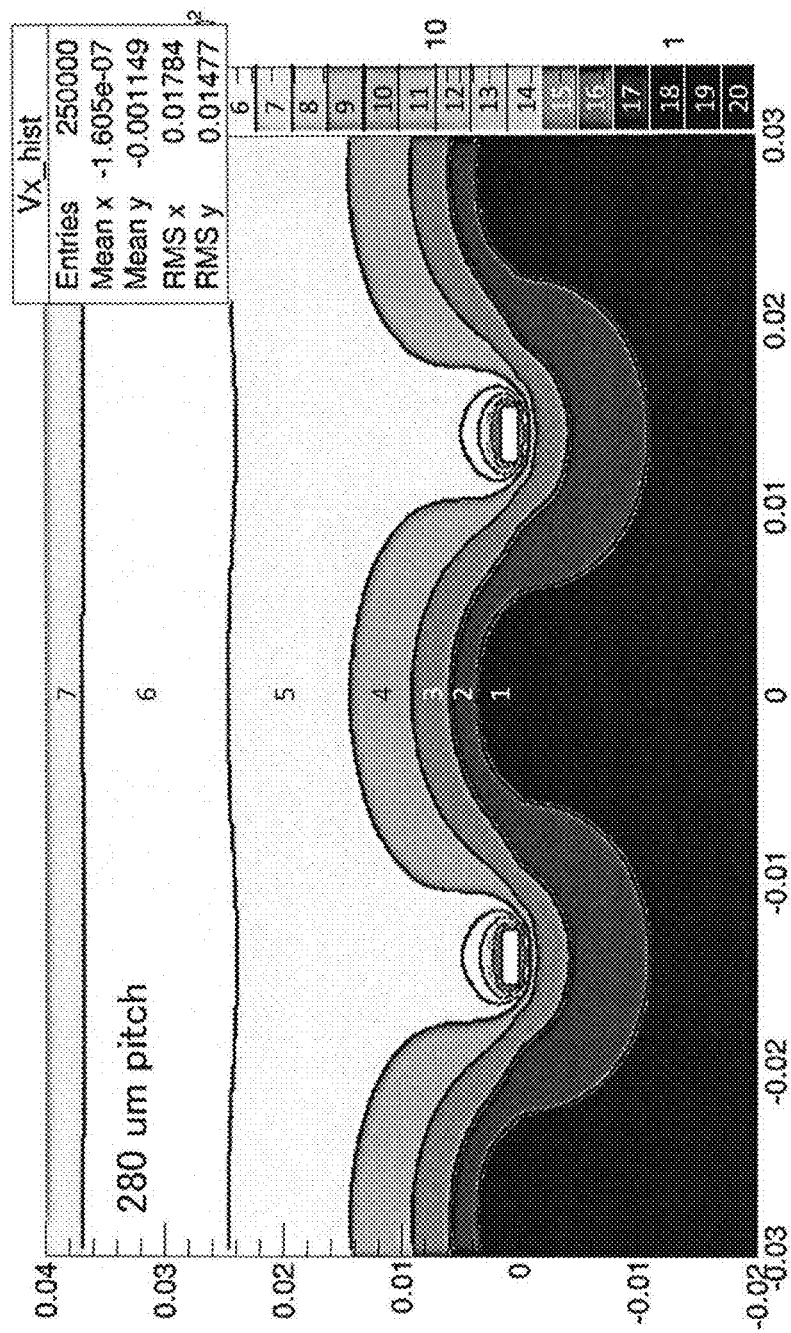
FIG. 5A is a potential distribution chart showing the simulation result of the potential distribution of the cross-section around the pixel electrodes when the pitch of the pixel electrode is 280 μm.
Figure 5B:
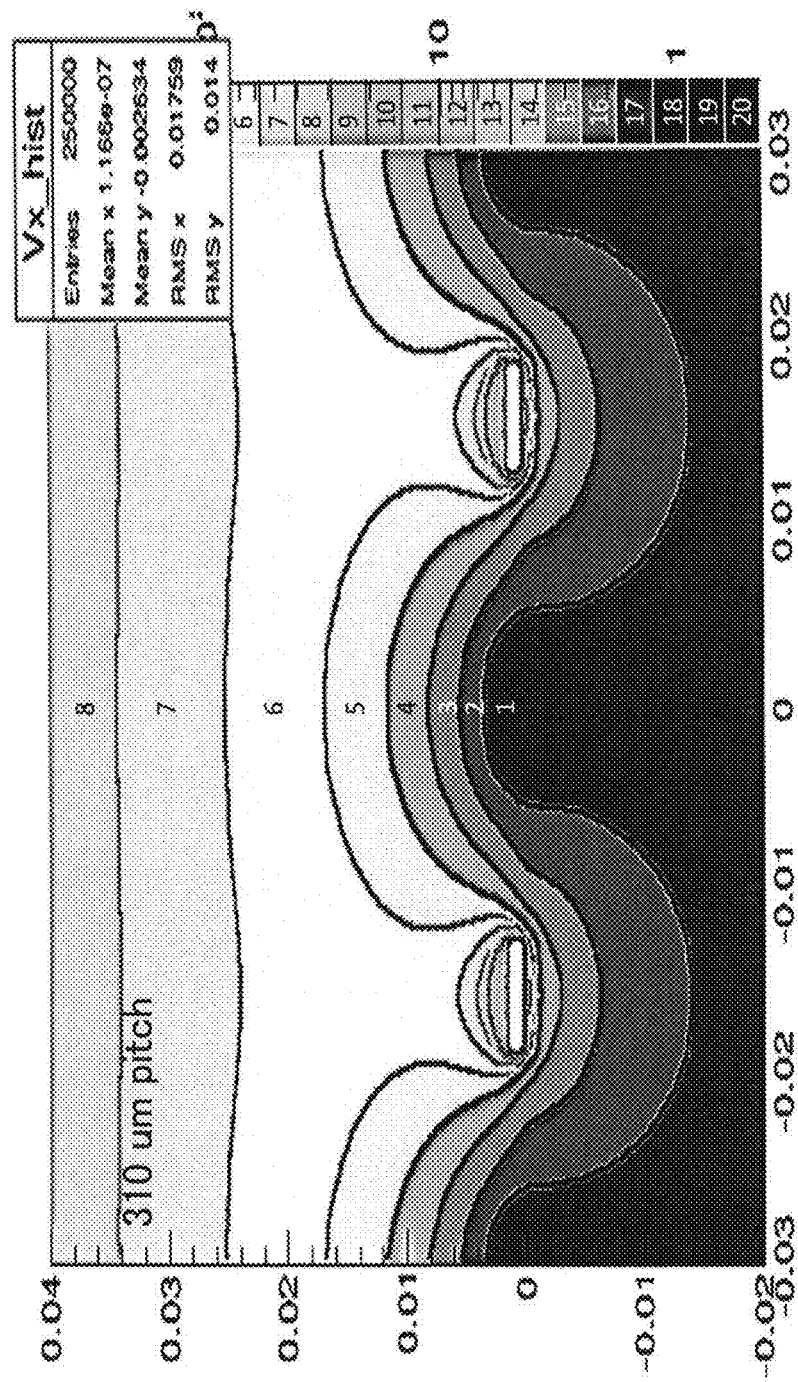
FIG. 5B is a potential distribution chart showing the simulation result of the potential distribution of the cross-section around the pixel electrodes when the pitch of the pixel electrode is 310 μm.
Figure 5C:
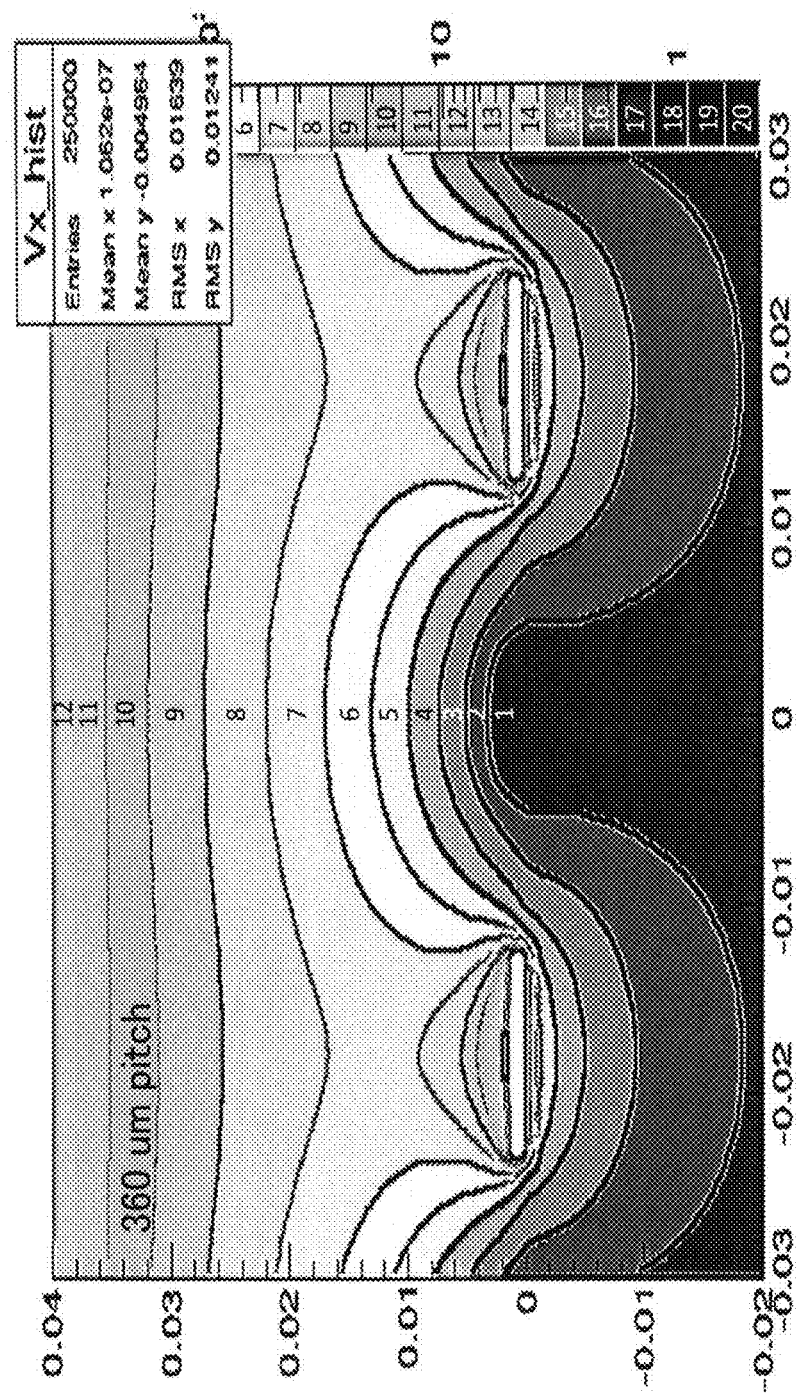
FIG. 5C is a potential distribution chart showing the simulation result of the potential distribution of the cross-section around the pixel electrodes when the pitch of the pixel electrode is 360 μm.
Figure 5D:
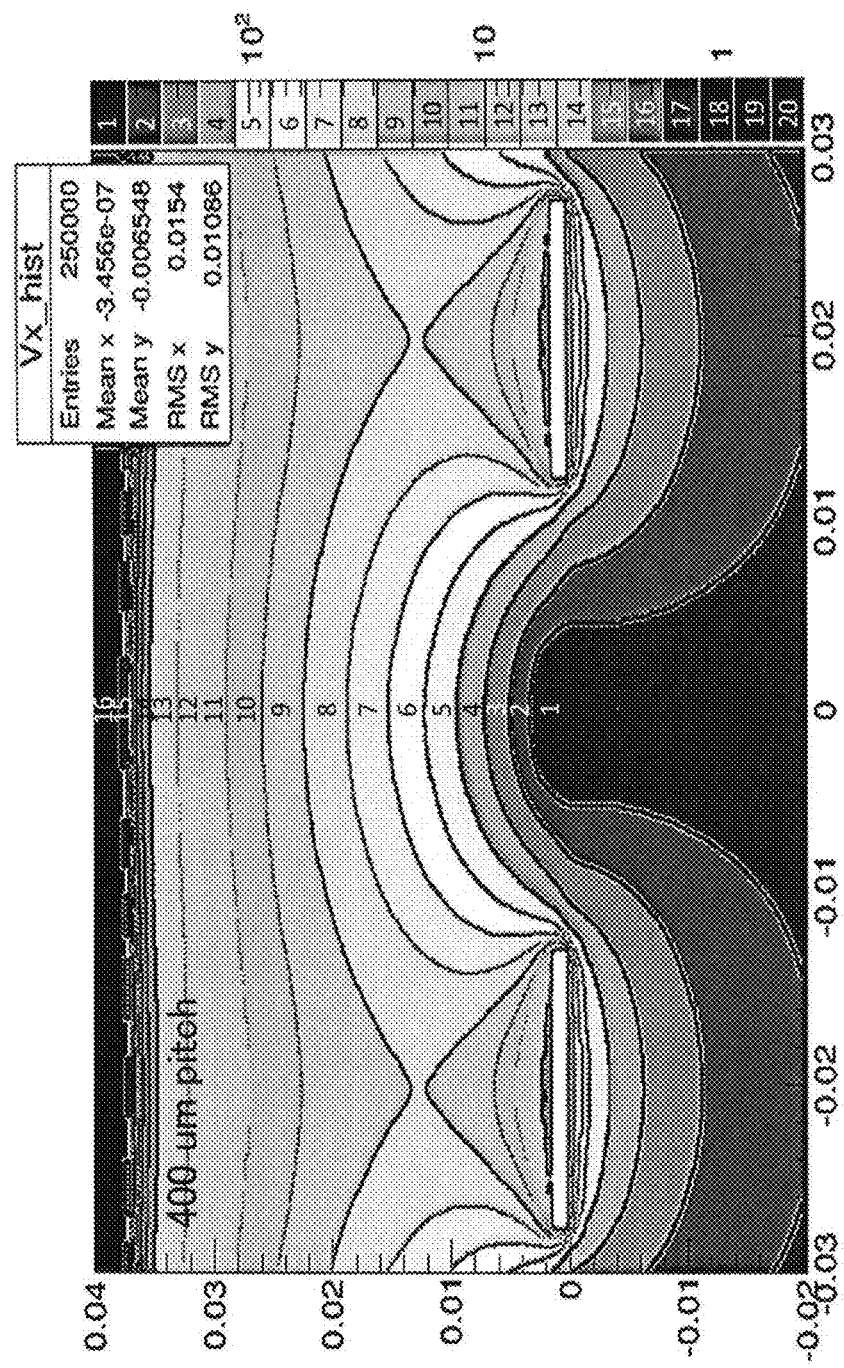
FIG. 5D is a potential distribution chart showing the simulation result of the potential distribution of the cross-section around the pixel electrodes when the pitch of h pixel electrode is 400 μm.

Fixed Values
Radius (R) of anode electrode: 30 µm
Opening diameter of cathode electrode: 250 µm
Interval (C) between cathode electrodes: 10 µm
Variable
Pitch (P) of cathode electrodes and anode electrodes: 280 µm to 600 µm FIG. 4 is a graph showing the relationship between gas amplification factors and the respective pixel electrode pitches in simulation 1. In this case, the voltage applied between the anode electrodes and the cathode electrodes was fixed to 460 V, and each electrode pitch was reduced from 600 μm to 280 μm. As shown in FIG. 4, it was found that as each electrode pitch was reduced from 600 μm to 400 μm, the gas amplification factor gradually decreased, whereas when each electrode pitch was less than 400 μm, the gas amplification factor noticeably decreased.

The following was considered as a cause of a reduction in gas amplification factor. As the area of each cathode electrode decreased relative to the area of each anode electrode, electrons were not focused on one anode electrode but were dispersed to the adjacent anode electrodes, resulting in a reduction in gas amplification factor. In order to verify this, electric field calculation was performed by using Elmer as a simulator.

FIG. 5A to FIG. 5D show the results of simulating potential distributions around pixel electrodes under the same conditions as those described above when the pixel electrode pitch is 280 μm, 310 μm, 360 μm, and 400 μm. FIG. 5A to FIG. 5D each show a sectional view of each pixel electrode, with the center of the anode electrode being located at x=0, and the first surface of the insulating member being located at y=0. That is, cathode electrodes (from an opening end to an adjacent opening end, including the interval between the cathode electrodes) are located at two blanks (white rectangles) located at y=0 in each of the drawings. The potential distribution obtained by each simulation is indicated by equipotential lines that divide the range of 0.45 V to 450 V into 20 regions, with the respective partitioned regions being assigned with numbers 1 to 20. In this case, the smaller numbers indicate higher potentials. As shown in FIG. 5A to FIG. 5D, as each electrode pitch decreases, regions 4 to 6 of the higher potential side on the first surface (y>0) of each pixel electrode also spread onto each cathode electrode. That is, as the area of the cathode electrode decreases, the potential difference between the anode electrode and the cathode electrode decreases. This supports the hypothesis that as the potential difference between the respective electrodes decreases, electrons are not focused on one anode electrode but are dispersed.

Simulation 2

The above results revealed that when each electrode pitch was less than 400 μm, it was necessary to change dimensional specifications including the anode electrode diameter, cathode electrode opening diameter, and cathode electrode width. For this reason, a simulation was performed with the cathode electrode opening diameter and the anode electrode diameter being reduced in conjunction with each electrode pitch. That is, the area ratio between the anode electrode and the cathode electrodes was fixed, and each electrode pitch was reduced. The following are the parameters used in this simulation.

Figure 6:
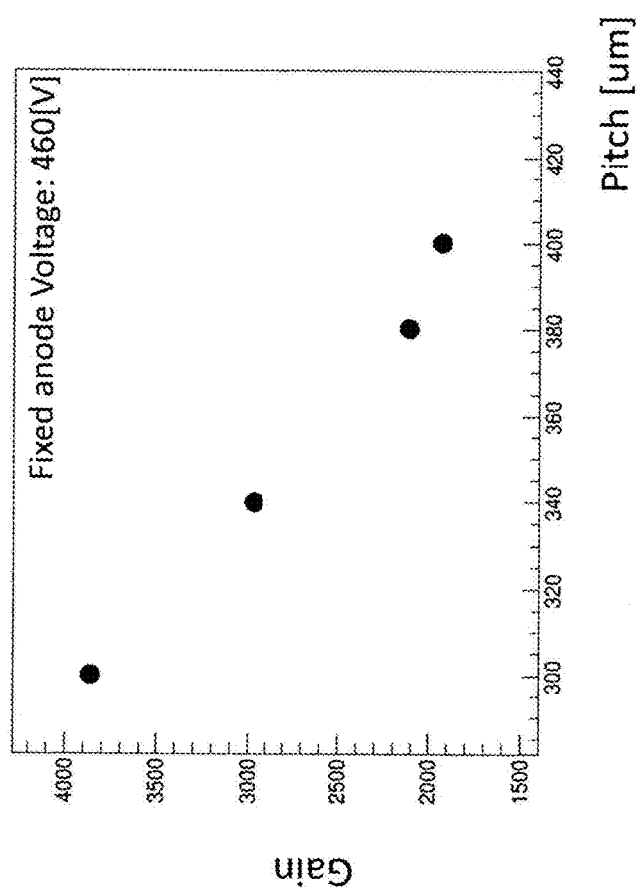
FIG. 6 is a graph showing the relationship between gas amplification factors and pixel electrode pitches in simulation 2.

Fixed Values
Interval (C) between cathode electrodes: 10 μm
Variable
Anode electrode radius (R): 21 μm to 30 μm
Cathode electrode opening diameter: 175 μm to 250 μm
Pitch (P) of cathode electrodes and anode electrodes: 280 μm to 400 μm FIG. 6 is a graph showing the relationship between gas amplification factors and the respective pixel electrode pitches in simulation 2. In this case, the voltage applied between the anode electrodes and the cathode electrodes was fixed to 460 V, and each electrode pitch, the cathode electrode opening diameter, and the anode electrode diameter were reduced. As shown in FIG. 6, it was found that when the area ratio between the anode electrode and the cathode electrode was fixed, the gas amplification factor increased with a reduction in each electrode pitch.

In an actual operation, as the distance between the anode electrode and the cathode electrode decreases, discharge easily occurs. However, it is possible to restrict the applied voltage by improving the gas amplification factor.

Example 1

Figure 7:
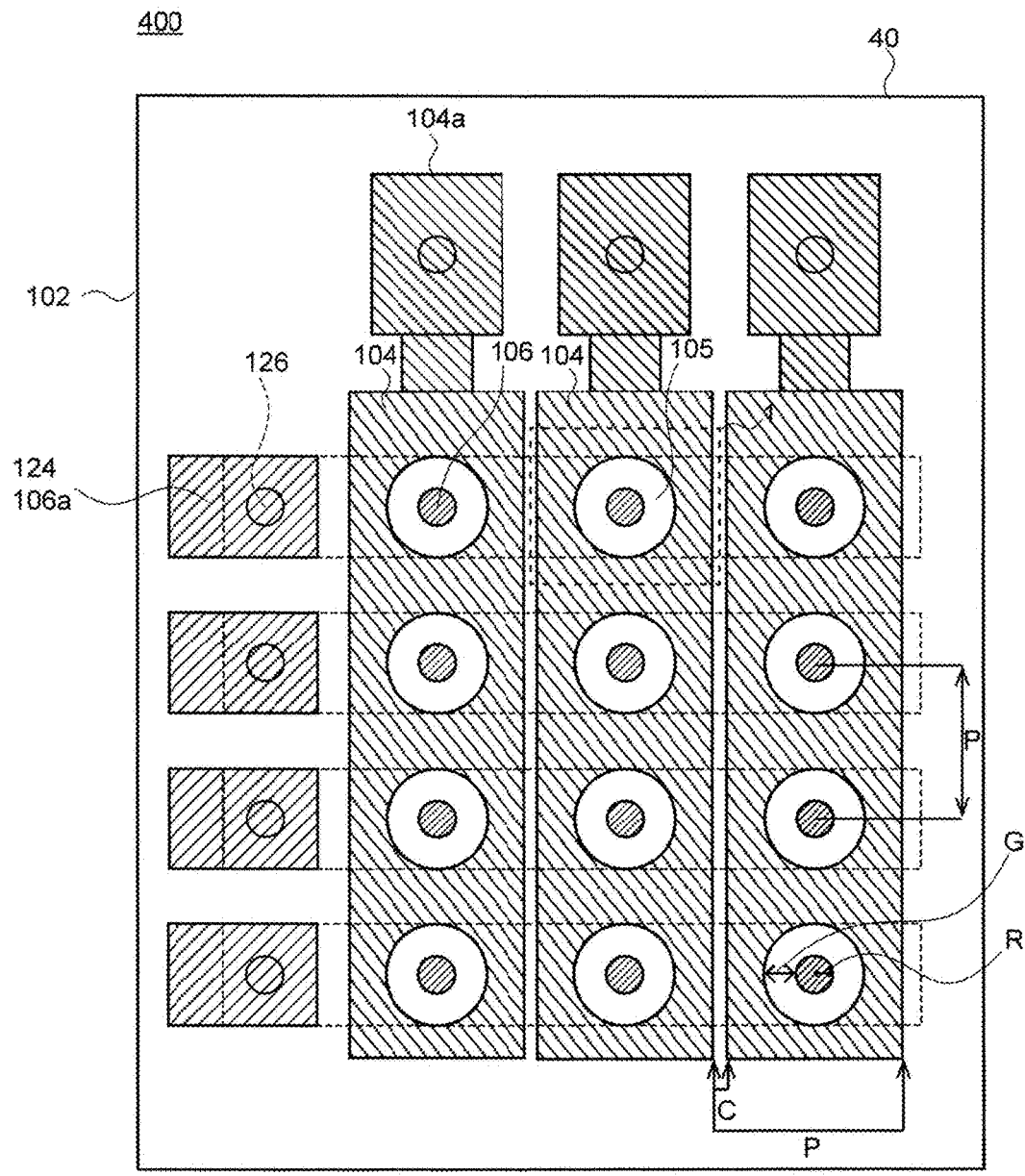
FIG. 7 is a planar view showing an example of a radiation detection device using a radiation detection element according to Example 1 of the present invention.

FIG. 7 is a planar view showing an example of a radiation detection device 400 using a radiation detection element 40 according to Example 1 of the present invention.

Figure 9A:
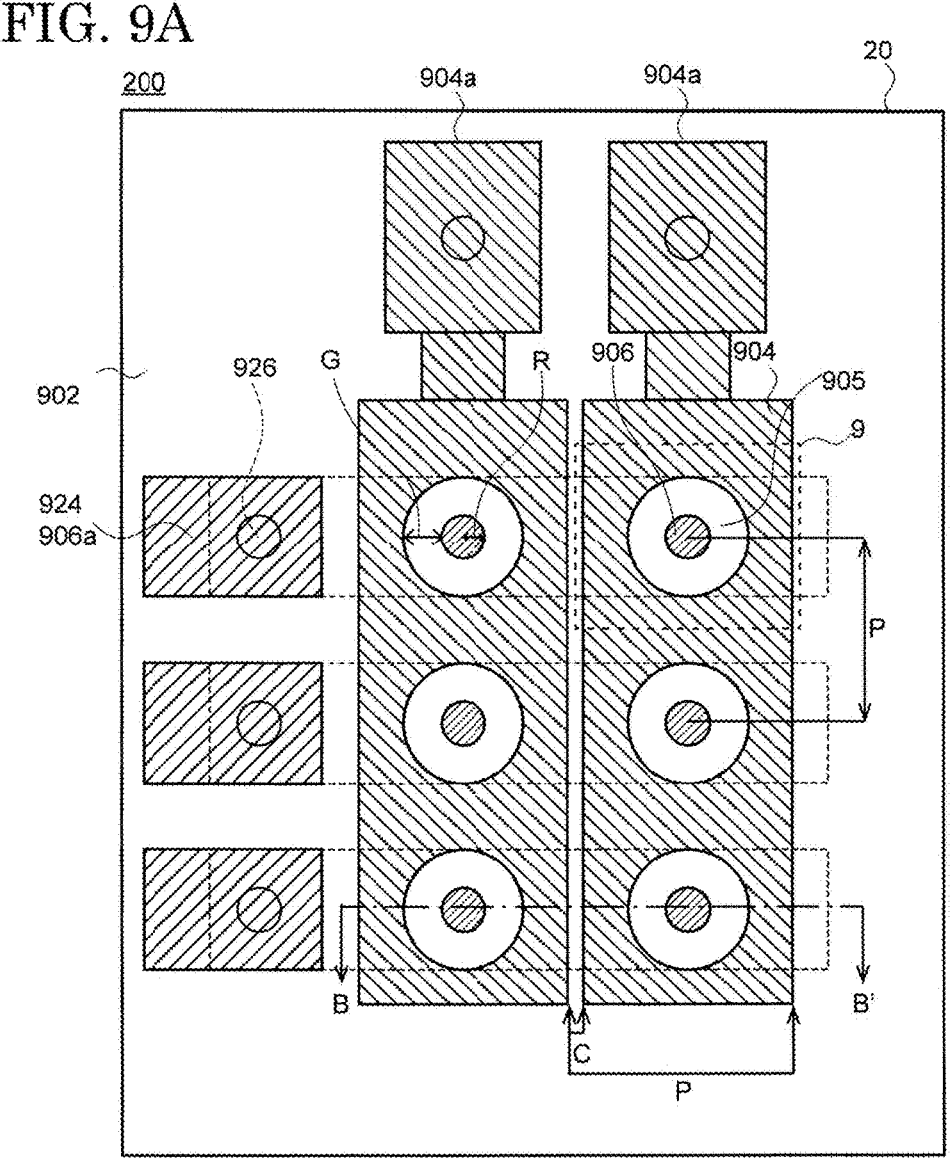
FIG. 9A is a planar view showing an example of a radiation detection device using a radiation detection element according to Comparative Example 1.

As shown in FIG. 7, the radiation detection element 40 according to Example 1 of the present invention is configured to improve the resolution of the radiation detection element (FIG. 9A; Comparative Example 1) according to a comparative example (to be described later) by reducing the configuration of a pixel electrode 1.

For example, the pitch of cathode electrodes 104 and the pitch of anode electrodes 106 are reduced from 400 μm to 300 μm. The following are the widths of each cathode electrode 104 and anode electrode 106, the pitches, and the like in such a radiation detection element:

Cathode electrode width: 262.5 μm
Cathode electrode opening diameter: 187.5 μm
Cathode electrode pitch (P): 300 μm
Anode electrode radius (R): 22.5 μm
Anode electrode pitch (P): 300 μm in row and column directions
Interval (C) between cathode electrodes: 37.5 μm
Interval (G) between cathode electrode and anode electrode: 71 μm As indicated by Table 1, the resolution of the radiation detection device 400 including the radiation detection element 40 described above was able to be improved from 100 μm to 75 μm. When a voltage of 440 V was applied to the anode electrode, the gas amplification factor was 2000. That is, a reduction in gas amplification factor, which occurred in Comparative Example 2, was able to be restricted. In addition, because an increase in voltage was able to be restricted, the possibility of discharge was able to be prevented.

TABLE 1

|  | pitch | Anode area | Cathode area | Cathode area/ Anode area | gain | re-solution | voltage |
| --- | --- | --- | --- | --- | --- | --- | --- |
| Example 1 | 300 | 1590 | 51152 | 32.2 | 2000 | 75 | 440 |
| Example 2 | 200 | 707 | 15314 | 21.7 | 2000 | 50 | 475 |
| Example 3 | 400 | 2826 | 90938 | 32.2 | 2000 | 100 | 460 |
| Example 4 | 300 | 2826 | 37938 | 13.4 | 834 | 75 | 460 |

Example 2

Figure 8:
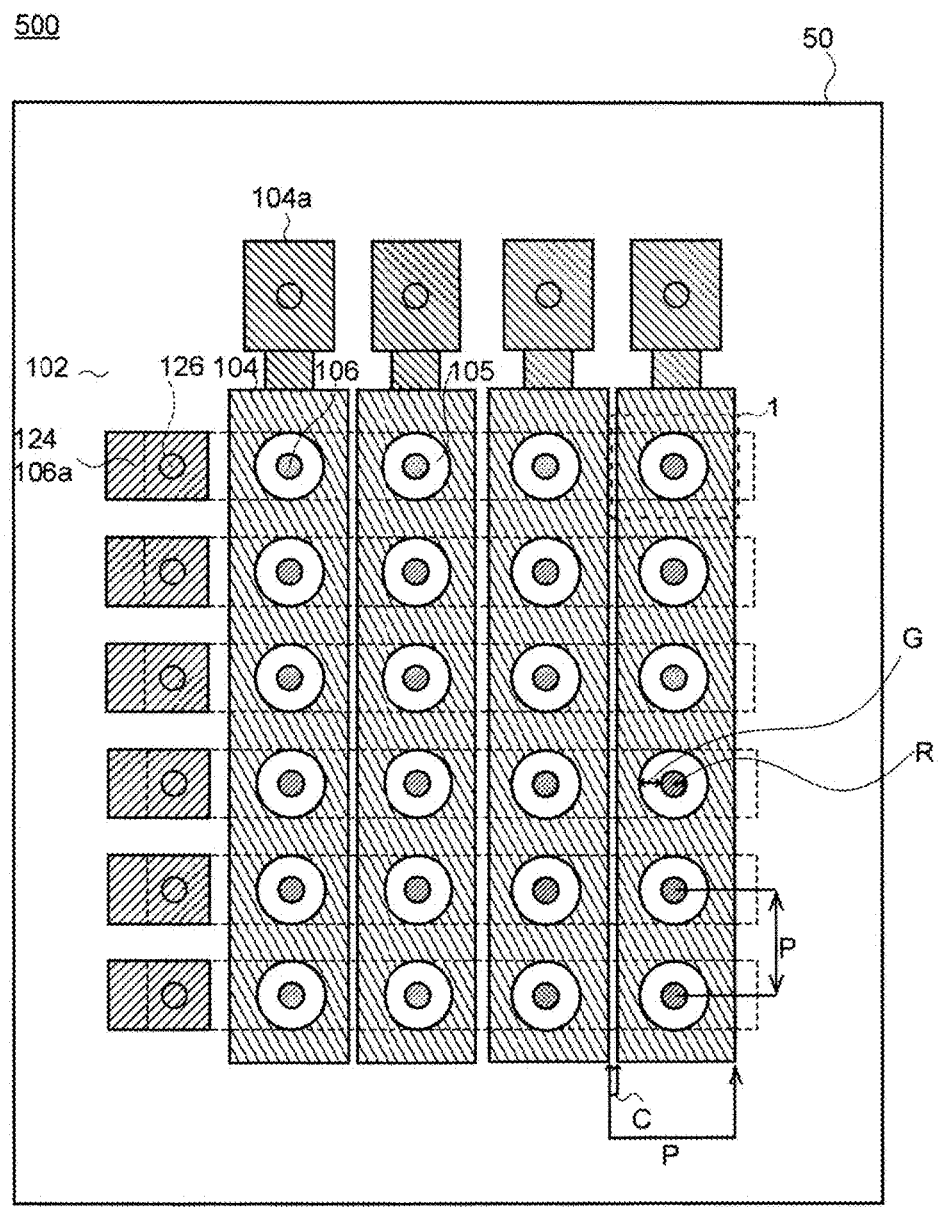
FIG. 8 is a planar view showing an example of a radiation detection device using a radiation detection element according to Example 2 of the present invention.

FIG. 8 is a planar view showing an example of a radiation detection device 500 using a radiation detection element 50 according to Example 2 of the present invention.

As shown in FIG. 8, the radiation detection element 50 according to Example 2 of the present invention is configured to further improve the resolution of the radiation detection element (FIG. 7) according to Example 1 by further reducing the configuration of each pixel electrode 1.

For example, the cathode electrode pitch and the anode electrode pitch are reduced from 300 µm to 200 µm. The following are the cathode electrode width, the anode electrode width, the pitches, and the like in such a radiation detection element:

Cathode electrode width: 190 µm
Cathode electrode opening diameter: 170 µm
Cathode electrode pitch (P): 200 µm
Anode electrode radius (R): 15 µm
Anode electrode pitch (P): 200 µm in row and column directions
Interval (C) between cathode electrodes: 10 µm
Interval (G) between cathode electrode and anode electrode: 70 µm As indicated by Table 1, it was able to further improve the resolution of the radiation detection device 500 including the radiation detection element 50 described above from 75 µm to 50 µm. When a voltage of 460 V was applied to the anode electrode, the gas amplification factor became 1347. Raising the voltage to 475 V was able to increase the gas amplification factor to 2000, thus restricting a reduction in gas amplification factor which occurred in Comparative Example 2 (to be described later). Although a voltage of 475 V was applied, when the interval between a cathode electrode 104 and an anode electrode 106 was 70 µm, no discharge occurred. This indicated that this interval provided resistance to a voltage of 475 V.

Comparative Example 1

Figure 9B:
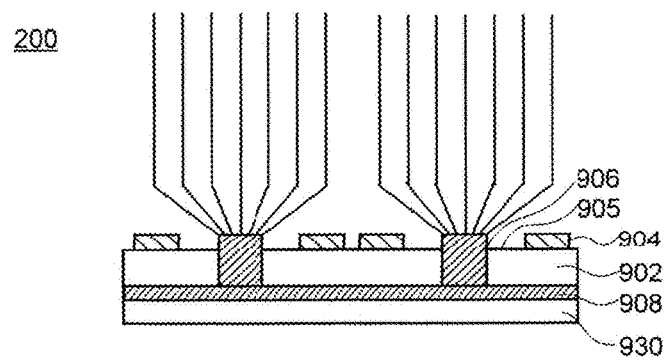
FIG. 9B is a sectional view showing an example of the radiation detection device using the radiation detection element according to Comparative Example 1.

FIG. 9A is a planar view showing an example of a radiation detection device 200 using a radiation detection element 20 according to Comparative Example 1. FIG. 9B is a sectional view showing an example of the radiation detection device 200 using the radiation detection element 20 according to Comparative Example 1.

The radiation detection element 20 according to Comparative Example 1 includes an insulating member 902, cathode electrodes 904, anode electrodes 906, anode electrode patterns 908, and a substrate 930.

In this case, a minimum repetition unit as a pixel electrode including the cathode electrode 904, an opening portion 905, the anode electrode 906, and the insulating member 902 is a pixel electrode 9. The pixel electrode 9 has a nearly square shape. Letting P be the length of one side of a pixel electrode, the pitch of the cathode electrodes 904 and the pitch of the anode electrodes 906 are also represented by P.

The following are the widths of each cathode electrode 904 and each anode electrode 906, the pitches, and the like in the radiation detection element according to Comparative Example 1.

The following are the configuration of the radiation detection element according to Comparative Example 1:
Cathode electrode width: 350 µm
Cathode electrode opening diameter: 250 µm
Cathode electrode pitch (P): 400 µm
Anode electrode radius (R): 30 µm
Anode electrode pitch (P): 400 µm in row and column directions
Interval (C) between cathode electrodes: 50 µm
Interval (G) between cathode electrode and anode electrode: 95 µm As indicated by Table 1, the resolution of the radiation detection device 200 including the radiation detection element 20 according to Comparative Example 1 is 100 µm. When a voltage of 460 V is applied to the anode electrode, the gas amplification factor was 2000.

In general, in order to improve the resolution of the radiation detection device, the array pitch of the pixel electrodes 9 is reduced. According to this method, however, reducing the interval between each cathode electrode 904 and a corresponding one of the anode electrodes 906 will increase the possibility of discharge. For this reason, the method used is to avoid the possibility of discharge and improve the resolution. That is, this method reduces the cathode electrode pitch and the anode electrode pitch without changing the opening diameter of each cathode electrode 904 and the diameter of each anode electrode 906.

For example, the cathode electrode pitch and the anode electrode pitch are reduced from 400 µm to 300 µm. The following are the widths of each cathode electrode and each anode electrode, the pitches, and the like in such a radiation detection element.

Comparative Example 2

Figure 10A:
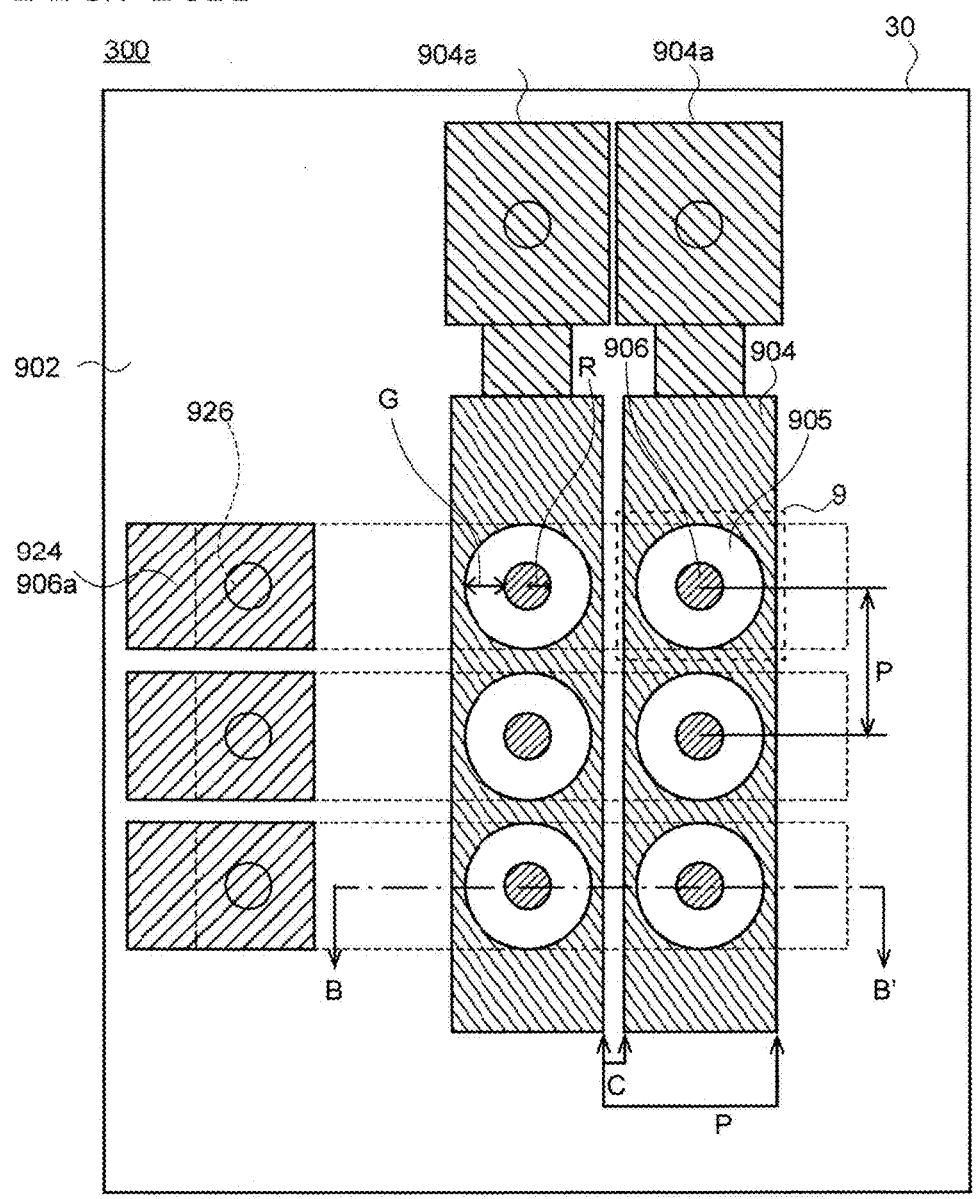
FIG. 10A is a planar view showing an example of a radiation detection device using a radiation detection element according to Comparative Example 2.
Figure 10B:
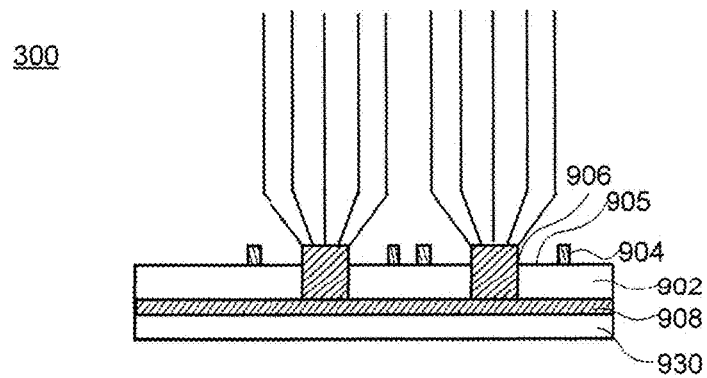
FIG. 10B is a sectional view showing an example of the radiation detection device using the radiation detection element according to Comparative Example 2.

The following are the configuration of the radiation detection element according to Comparative Example 2:
Cathode electrode width: 290 µm
Cathode electrode opening diameter: 250 µm
Cathode electrode pitch (P): 300 µm
Anode electrode radius (R): 30 µm
Anode electrode pitch (P): 300 µm in row and column directions
Interval (C) between cathode electrodes: 10 µm
Interval (G) between cathode electrode and anode electrode: 95 µm FIG. 10A is a planar view showing an example of a radiation detection device 300 using a radiation detection element 30 according to Comparative Example 2 with an improved resolution. FIG. 10B is a sectional view showing an example of the radiation detection device 300 using the radiation detection element 30 according to Comparative Example 2 with an improved resolution.

As indicated by Table 1, the resolution of the radiation detection device 300 including the radiation detection element 30 described above is 75 µm. When a voltage of 460 V is applied to the anode electrode, the gas amplification factor was 834. It was found that, as compared with Comparative Example 1, although the resolution was improved, the gas amplification factor was reduced to almost half. This coincides with the simulation results. This reduction in gas amplification factor, in particular, poses a serious problem when this device is used for a medical application to detect γ rays, which requires a high gas amplification factor.

As shown in FIG. 9B and FIG. 10B, the following was considered as a cause of a reduction in gas amplification factor. As the area of each cathode electrode decreased relative to the area of each anode electrode, electrons were not focused on one anode electrode but were dispersed to the adjacent anode electrodes, resulting in a reduction in gas amplification factor.

Example 3

As indicated by Table 2, the following are the widths of each cathode electrode and each anode electrode, the pitches, and the like in the radiation detection element according to Example 3 of the present invention:

Cathode electrode width: 190 μm
Cathode electrode opening diameter: 175 μm
Cathode electrode pitch (P): 200 μm
Anode electrode radius (R): 17.5 μm
Anode electrode pitch (P): 200 μm in row and column directions
Interval (C) between cathode electrodes: 10 μm
Interval (G) between cathode electrode and anode electrode: 70 μm

TABLE 2

|  | pitch | Anode area | Cathode area | Cathode area/ Anode area | gain | resolution | voltage |
|---|---|---|---|---|---|---|---|
| Example 2 | 200 | 707 | 15314 | 21.7 | 2000 | 50 | 475 |
| Example 3 | 200 | 962 | 13959 | 14.5 | 2000 | 50 | 482 |
| Comparative Example 3 | 200 | 1256 | 12566 | 10.0 | 1500 | 50 | 484 |

The resolution of the radiation detection device including such a radiation detection element was 50 μm. When a voltage of 460 V was applied to the anode electrode, the gas amplification factor was 902.2. However, raising the voltage to 482 V made it possible to increase the gas amplification factor to 2000 and restrict a reduction in gas amplification factor as in Comparative Example 2. Although a voltage of 482 V was applied to the anode electrode, an interval of 70 μm between a cathode electrode 104 and an anode electrode 106 provided a sufficient withstanding voltage.

Comparative Example 3

As indicated by Table 2, the following are the widths of each cathode electrode and each anode electrode, the pitches, and the like in the radiation detection element according to Comparative Example 3:
Cathode electrode width: 190 μm
Cathode electrode opening diameter: 180 μm
Cathode electrode pitch (P): 200 μm
Anode electrode radius (R): 20 μm
Anode electrode pitch (P): 200 μm in row and column directions
Interval (C) between cathode electrodes: 10 μm
Interval (G) between cathode electrode and anode electrode: 70 μm
The resolution of the radiation detection device including such a radiation detection element was 50 μm. When a voltage of 460 V was applied to the anode electrode, the gas amplification factor was 621.8. Even when the voltage was raised to 484 V, because discharge occurred, the gas amplification factor was only able to be increased to 1500. That is, a gas amplification factor of 2000 necessary for the detection of γ rays was not able to be ensured.

Example 4

As indicated by Table 3, the following are the widths of each cathode electrode and each anode electrode, the pitches, and the like in the radiation detection element according to Example 4 of the present invention:
Cathode electrode width: 290 μm
Cathode electrode opening diameter: 176 μm
Cathode electrode pitch (P): 300 μm
Anode electrode radius (R): 17 μm
Anode electrode pitch (P): 300 μm in row and column directions
Interval (C) between cathode electrodes: 10 μm
Interval (G) between cathode electrode and anode electrode: 71 μm

TABLE 3

|  | pitch | Anode area | Cathode area | Cathode area/ Anode area | gain | resolution | voltage |
|---|---|---|---|---|---|---|---|
| Example 1 | 300 | 1590 | 51152 | 32.2 | 2000 | 75 | 440 |
| Example 4 | 300 | 907 | 62684 | 69.1 | 2000 | 75 | 448 |
| Example 5 | 300 | 2375 | 37659 | 15.9 | 2000 | 75 | 480 |
| Comparative Example 4 | 300 | 707 | 73734 | 104.4 | 2000 | 75 | 457 |
| Comparative Example 5 | 300 | 3317 | 42010 | 12.7 | 1800 | 75 | 483 |

The resolution of the radiation detection device including such a radiation detection element was 75 μm. When a voltage of 448 V was applied to the anode electrode, the gas amplification factor was 2000. That is, a reduction in gas amplification factor, which occurred in Comparative Example 2, was able to be restricted. In addition, because an increase in voltage was able to be restricted, the possibility of discharge was able to be prevented.

Example 5

As indicated by Table 3, the following are the widths of each cathode electrode and each anode electrode, the pitches, and the like in the radiation detection element according to Example 5 of the present invention:
Cathode electrode width: 258 μm
Cathode electrode opening diameter: 225 μm
Cathode electrode pitch (P): 300 μm
Anode electrode radius (R): 27.5 μm
Anode electrode pitch (P): 300 μm in row and column directions
Interval (C) between cathode electrodes: 42 μm
Interval (G) between cathode electrode and anode electrode: 85 μm
The resolution of the radiation detection device including such a radiation detection element was 75 μm. When a voltage of 480 V was applied to the anode electrode, the gas amplification factor was 2000. A reduction in gas amplification factor, which occurred in Comparative Example 2, was able to be restricted.

Comparative Example 4

As indicated by Table 3, the following are the widths of each cathode electrode and each anode electrode, the pitches, and the like in the radiation detection element according to Comparative Example 4:
Cathode electrode width: 290 μm
Cathode electrode opening diameter: 130 μm
Cathode electrode pitch (P): 300 μm
Anode electrode radius (R): 15 μm
Anode electrode pitch (P): 300 μm in row and column directions
Interval (C) between cathode electrodes: 10 μm
Interval (G) between cathode electrode and anode electrode: 50 μm The resolution of the radiation detection device including such a radiation detection element was 75 µm. When a voltage of 457 V was applied to the anode electrode, measurement was not able to be performed because of frequent occurrence of discharge.

Comparative Example 5

As indicated by Table 3, the following are the widths of each cathode electrode and each anode electrode, the pitches, and the like in the radiation detection element according to Comparative Example 5 of the present invention:
Cathode electrode width: 250 µm
Cathode electrode opening diameter: 205 µm
Cathode electrode pitch (P): 300 µm
Anode electrode radius (R): 32.5 µm
Anode electrode pitch (P): 300 µm in row and column directions
Interval (C) between cathode electrodes: 50 µm
Interval (G) between cathode electrode and anode electrode: 70 µm The resolution of the radiation detection device including such a radiation detection element was 75 µm. When a voltage of 483 V was applied to the anode electrode, measurement was not able to be performed because of frequent occurrence of discharge. It was found that an interval of 70 µm between the cathode electrode 104 and the anode electrode 106 provided no resistance to a voltage of 483 V.

Example 6

As indicated by Table 4, the following are the widths of each cathode electrode and each anode electrode, the pitches, and the like in the radiation detection element according to Example 6 of the present invention:
Cathode electrode width: 370 µm
Cathode electrode opening diameter: 200 µm
Cathode electrode pitch (P): 380 µm
Anode electrode radius (R): 15 µm
Anode electrode pitch (P): 380 µm in row and column directions
Interval (C) between cathode electrodes: 10 µm
Interval (G) between cathode electrode and anode electrode: 85 µm

TABLE 4

|  | pitch | Anode area | Cathode area | Cathode area/ Anode area | gain | resolution | voltage |
| --- | --- | --- | --- | --- | --- | --- | --- |
| Example 6 | 380 | 707 | 109200 | 154.6 | 2000 | 95 | 411 |
| Example 7 | 380 | 2826 | 76338 | 27 | 2000 | 95 | 461 |
| Example 8 | 380 | 3847 | 60574 | 15.7 | 2000 | 95 | 480 |
| Comparative Example 6 | 380 | 707 | 127334 | 180.2 | 2000 | 95 | 404 |
| Comparative Example 7 | 380 | 11304 | 64734 | 5.7 | 2000 | 95 | 516.2 |

The resolution of the radiation detection device including such a radiation detection element was 95 µm. When a voltage of 411 V was applied to the anode electrode, the gas amplification factor was 2000.

Example 7

As indicated by Table 4, the following are the widths of each cathode electrode and each anode electrode, the pitches, and the like in the radiation detection element according to Example 7 of the present invention:
Cathode electrode width: 330 µm
Cathode electrode opening diameter: 250 µm
Cathode electrode pitch (P): 380 µm
Anode electrode radius (R): 30 µm
Anode electrode pitch (P): 380 µm in row and column directions
Interval (C) between cathode electrodes: 50 µm
Interval (G) between cathode electrode and anode electrode: 95 µm The resolution of the radiation detection device including such a radiation detection element was 95 µm. When a voltage of 461 V was applied to the anode electrode, the gas amplification factor was 2000.

Example 8

As indicated by Table 4, the following are the widths of each cathode electrode and each anode electrode, the pitches, and the like in the radiation detection element according to Example 8 of the present invention:
Cathode electrode width: 310 µm
Cathode electrode opening diameter: 270 µm
Cathode electrode pitch (P): 380 µm
Anode electrode radius (R): 35 µm
Anode electrode pitch (P): 380 µm in row and column directions
Interval (C) between cathode electrodes: 70 µm
Interval (G) between cathode electrode and anode electrode: 100 µm The resolution of the radiation detection device including such a radiation detection element was 95 µm. When a voltage of 480 V was applied to the anode electrode, the gas amplification factor was 2000.

Comparative Example 6

As indicated by Table 4, the following are the widths of each cathode electrode and each anode electrode, the pitches, and the like in the radiation detection element according to Comparative Example 6:
Cathode electrode width: 370 µm
Cathode electrode opening diameter: 130 µm
Cathode electrode pitch (P): 380 µm
Anode electrode radius (R): 15 µm
Anode electrode pitch (P): 380 µm in row and column directions
Interval (C) between cathode electrodes: 10 µm
Interval (G) between cathode electrode and anode electrode: 50 µm The resolution of the radiation detection device including such a radiation detection element was 95 µm. When a voltage of 404 V was applied to the anode electrode, discharge frequently occurred.

Comparative Example 7

As indicated by Table 4, the following are the widths of each cathode electrode and each anode electrode, the pitches, and the like in the radiation detection element according to Comparative Example 7:

Cathode electrode width: 310 μm
Cathode electrode opening diameter: 260 μm
Cathode electrode pitch (P): 380 μm
Anode electrode radius (R): 60 μm
Anode electrode pitch (P): 380 μm in row and column directions
Interval (C) between cathode electrodes: 70 μm
Interval (G) between cathode electrode and anode electrode: 70 μm The resolution of the radiation detection device including such a radiation detection element was 95 μm. When a voltage of 516 V was applied to the anode electrode, discharge frequently occurred.

Figure 11:
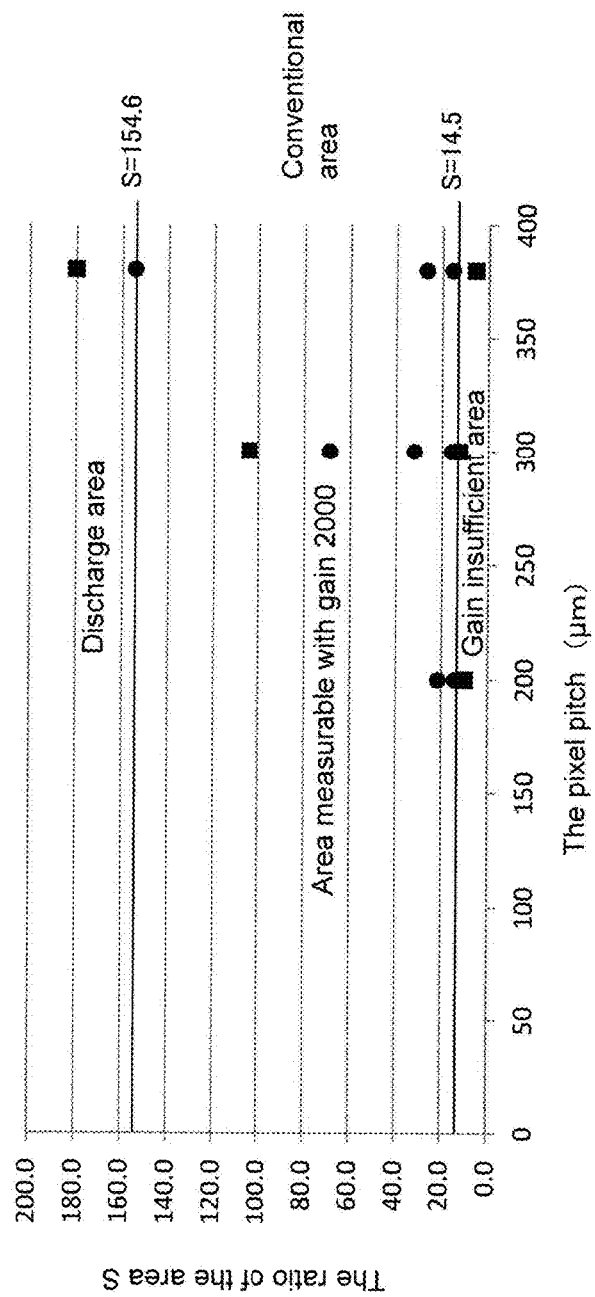
FIG. 11 is a graph showing the relationship between the ratios of the areas of cathode electrodes to the areas of anode electrodes and pixel electrode pitches.

With the above structure, FIG. 11 shows the relationship between each pixel electrode pitch and a ratio S of the area of a cathode electrode 104 to that of an anode electrode 106. When 154.6<S, discharge frequently occurs. When S<14.5, the gain does not reach 2000. The results shown in FIG. 11 reveal that a radiation detection device using a radiation detection element according to this embodiment of the present invention in which the ratio S of the area of each cathode electrode 104 to that of a corresponding one of the anode electrodes 106 satisfies the range of 14.5 (inclusive) to 154.6 (inclusive) can be provided as a radiation detection device that has improved the resolution without reducing the gas amplification factor.

Figure 12:
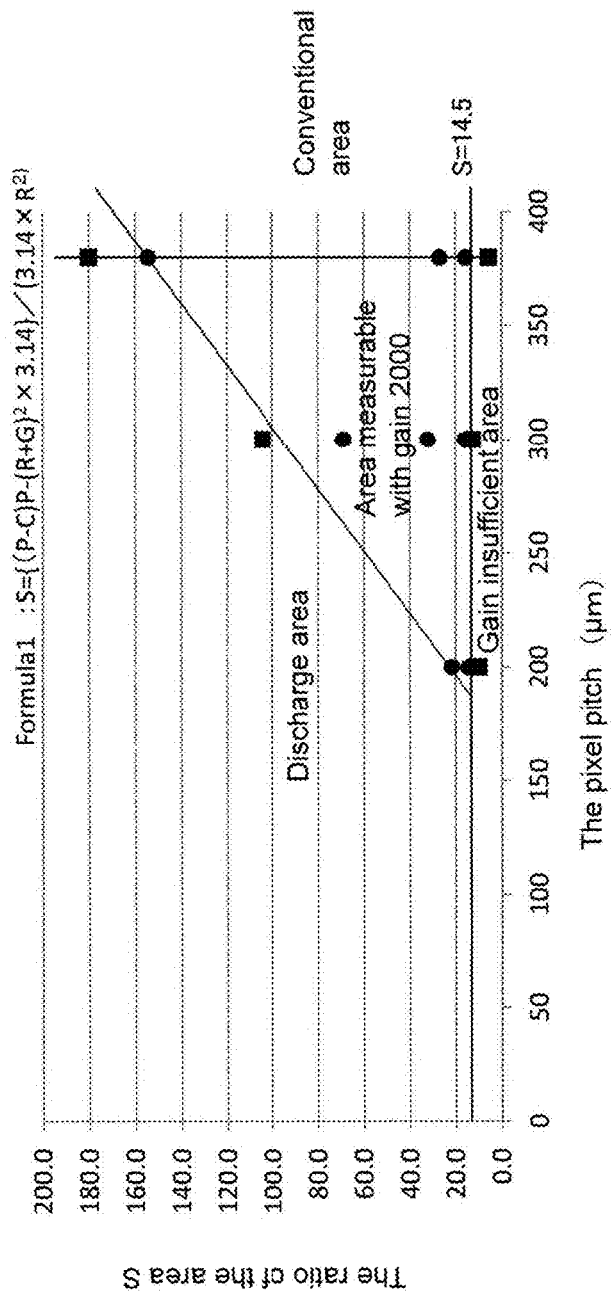
FIG. 12 is a graph showing the relationship between the ratios of the areas of cathode electrodes to the areas of anode electrodes and pixel electrode pitches.

This radiation detection device will be described in more detail with reference to FIG. 12. Plotting the results obtained by the above comparative example with rectangles, and the results obtained by the example with circles indicates that the range in which measurement can be performed with a gas amplification factor of 2000 is the triangular region surrounded by the three lines. A radiation detection device using a radiation detection element according to this embodiment of the present invention in which the area ratio between the cathode electrode 104 and the anode electrodes 106 on the first surface falls within the range of 14.5:1 to $[(P-C)P-(R+G)^2 \times 3.14]/(3.14 \times R^2):1$ can be provided as a radiation detection device that has improved the resolution without reducing the gas amplification factor. Letting P be a pixel electrode pitch, C be the interval between the cathode electrodes 104, R be the radius of the anode electrode 106, and G be the interval between the cathode electrode 104 and the anode electrode 106, 200 (μm)≤P≤380 (μm), 10 (μm)≤C, and 30 (μm)≤R.

What is claimed is:

1. A radiation detection element comprising a plurality of pixel electrodes, each pixel electrodes comprising:
   a first electrode placed on a first surface of an insulating member and having an opening portion; and
   a second electrode placed at the opening portion of the first electrode,
   wherein
   the plurality of pixel electrodes is arrayed in a row direction and a column direction,
   a pitch of the pixel electrodes in the row direction and the column direction is 380 μm or less, and
   an area ratio between the first electrode and the second electrode falls within a range of 14.5:1 to 154.6:1.

2. The radiation detection element according to claim 1, wherein
   the pitch of the pixel electrodes is 300 μm or less, and
   the area ratio between the first electrode and the second electrode falls within a range of 15.9:1 to 69.1:1.

3. The radiation detection element according to claim 1, wherein
   the pitch of the pixel electrodes is 200 μm, and
   the area ratio between the first electrode and the second electrode falls within a range of 14.5:1 to 21.7:1.

4. A radiation detection element comprising a plurality of pixel electrodes, each pixel electrodes comprising:
   a first electrode placed on a first surface of an insulating member and having an opening portion; and
   a second electrode placed at the opening portion of the first electrode,
   wherein
   the plurality of pixel electrodes is arrayed in a row direction and a column direction,
   a pitch of the pixel electrodes in the row direction and the column direction is 380 μm or less,
   letting P be a pitch of the pixel electrodes, C be an interval between the first electrodes, R be a radius of the second electrode, and G be an interval between the first electrode and the second electrode, 200 (μm)≤P≤380 (μm), 10 (μm)≤C, and 30 (μm)≤R, and
   an area ratio between the first electrode and the second electrode falls within a range of 14.5:1 to $[(P-C)P-(R+G)^2 \times 3.14]/(3.14 \times R^2):1$.

5. A radiation detection device comprising a radiation detection element, the radiation detection element comprising a plurality of pixel electrodes, each pixel electrodes comprising:
   a first electrode placed on a first surface of an insulating member and having an opening portion; and
   a second electrode placed at the opening portion of the first electrode,
   wherein
   the plurality of pixel electrodes is arrayed in a row direction and a column direction,
   a pitch of the pixel electrodes in the row direction and the column direction is 380 μm or less, and
   an area ratio between the first electrode and the second electrode falls within a range of 14.5:1 to 154.6:1.

6. The radiation detection device according to claim 5, wherein
   the pitch of the pixel electrodes is 300 μm or less, and
   the area ratio between the first electrode and the second electrode falls within a range of 15.9:1 to 69.1:1.

7. The radiation detection device according to claim 5, wherein
   the pitch of the pixel electrodes is 200 μm, and
   the area ratio between the first electrode and the second electrode falls within a range of 14.5:1 to 21.7:1.

8. The radiation detection device according to claim 5, wherein a resolution is 95 μm or less, and a gas amplification factor is 2000 or more.

9. The radiation detection device according to claim 5, wherein
   letting P be a pitch of the pixel electrodes, C be an interval between the first electrodes, R be a radius of the second electrode, and G be an interval between the first electrode and the second electrode, 200 (μm)≤P≤380 (μm), 10 (μm)≤C, and 30 (μm)≤R, and
   an area ratio between the first electrode and the second electrode falls within a range of 14.5:1 to $[(P-C)P-(R+G)^2 \times 3.14]/(3.14 \times R^2):1$.

10. The radiation detection device according to claim 9, wherein a resolution is 95 μm or less, and a gas amplification factor is 2000 or more.

* * * * *